United States Patent [19]
McWilliams et al.

[11] Patent Number: 5,645,292
[45] Date of Patent: Jul. 8, 1997

[54] ATV TRAILER

[76] Inventors: James Scott McWilliams, 302 Mills; Archie Gene Scribner, 306 Mills, both of Dumas, Tex. 79029

[21] Appl. No.: 520,644

[22] Filed: Aug. 29, 1995

[51] Int. Cl.⁶ ............................................. B60P 3/05
[52] U.S. Cl. ..................... 280/494; 280/47.26; 280/63; 280/789
[58] Field of Search ................... 280/659, 656, 280/652, 47.24, 47.26, 47.15, 47.13, 63, 400, 467, 498, 492, 493, 789, 790, 798, 414.1, 202, 204, 79.2, 79.3; 414/462; 298/5, 18

[56] References Cited

U.S. PATENT DOCUMENTS

| | | | |
|---|---|---|---|
| 1,779,887 | 10/1930 | Melanson | 280/63 |
| 2,856,091 | 10/1958 | Johnson | 214/506 |
| 2,912,253 | 11/1959 | Harris et al. | 280/106 |
| 2,919,953 | 1/1960 | Gruhlkey | 298/18 |
| 3,413,014 | 11/1968 | Franz | 280/400 |
| 4,040,643 | 8/1977 | Applequist et al. | 280/656 |
| 4,052,080 | 10/1977 | Hedderich et al. | 280/47.26 |
| 4,180,279 | 12/1979 | Belliveau et al. | 280/204 |
| 4,314,712 | 2/1982 | Owen et al. | 280/656 |
| 4,548,423 | 10/1985 | Craven | 280/204 |
| 4,789,180 | 12/1988 | Bell | 280/652 |
| 5,018,651 | 5/1991 | Hull et al. | 414/462 |
| 5,123,668 | 6/1992 | Ligas | 280/204 |
| 5,222,753 | 6/1993 | Parish | 280/400 |
| 5,295,555 | 3/1994 | Strange | 182/63 |
| 5,340,134 | 8/1994 | Dodson | 280/37 |
| 5,354,090 | 10/1994 | Grovom | 280/656 |

*Primary Examiner*—Anne Marie Boehler
*Attorney, Agent, or Firm*—Jacobson, Price, Holman & Stern, PLLC

[57] ABSTRACT

A two wheeled trailer is provided including an upwardly opening body which is generally V-shaped in cross section. The trailer includes a forward end, a forwardly projecting towing tongue and the forward end of the towing tongue incorporates a towing coupler mounted from the towing tongue for at least 90° angular displacement, in either direction, relative to the towing tongue about an axis paralleling the towing tongue.

6 Claims, 3 Drawing Sheets

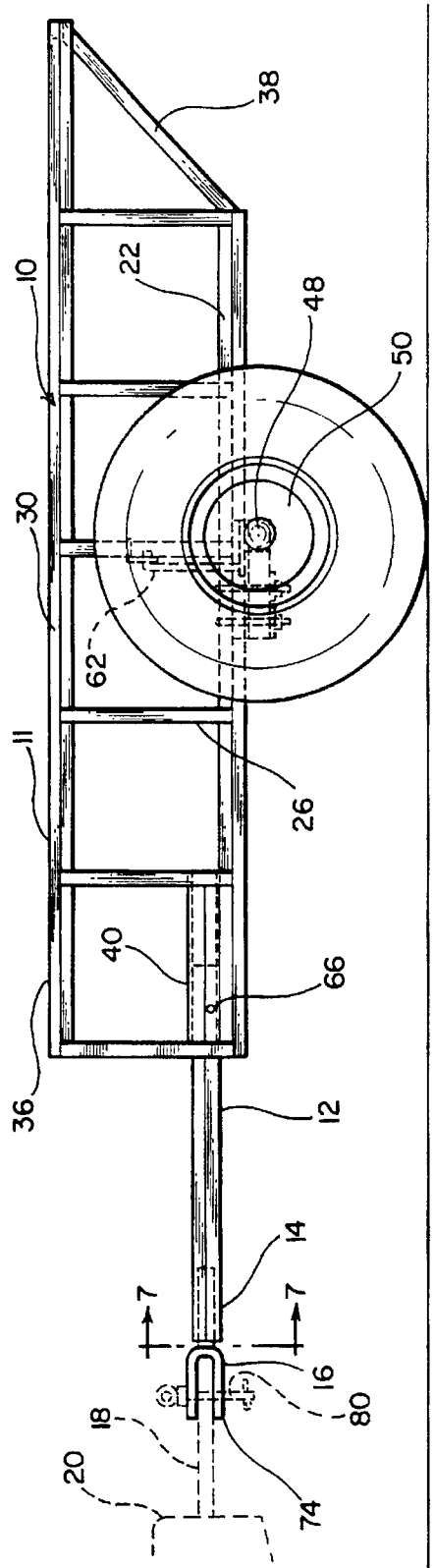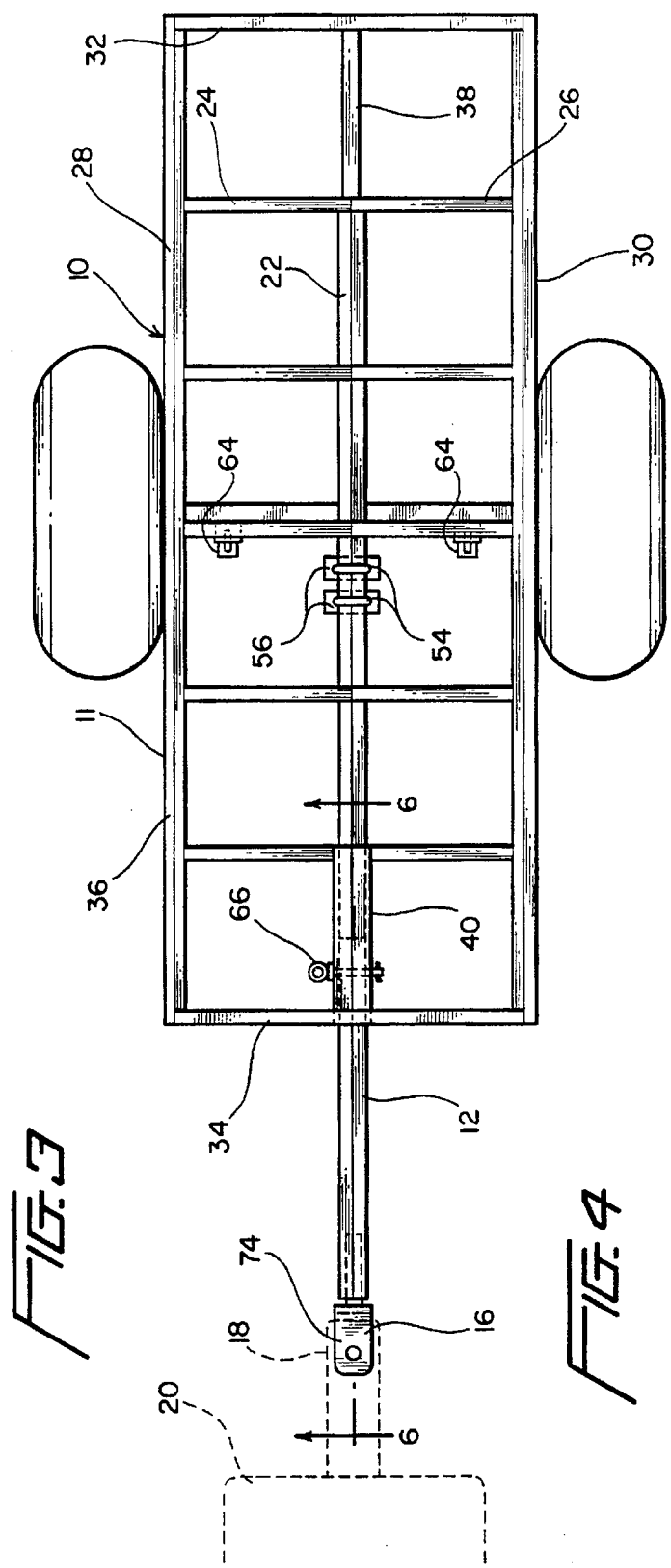

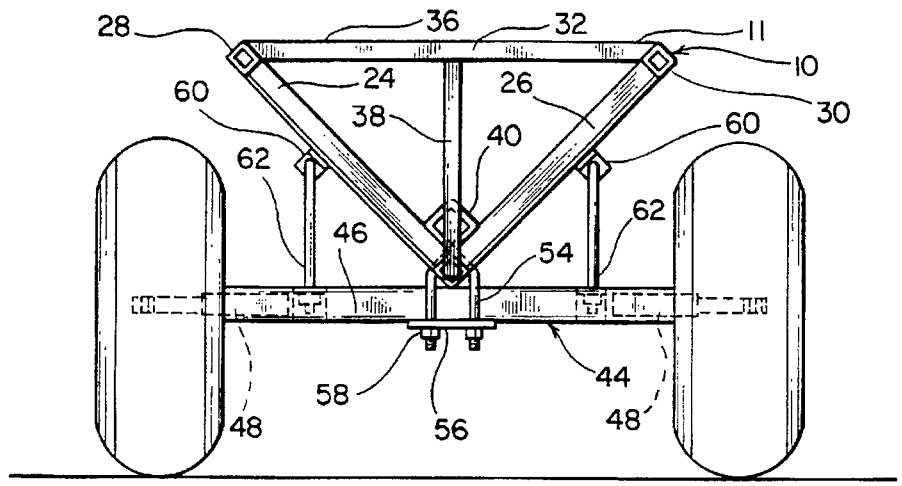
FIG. 5
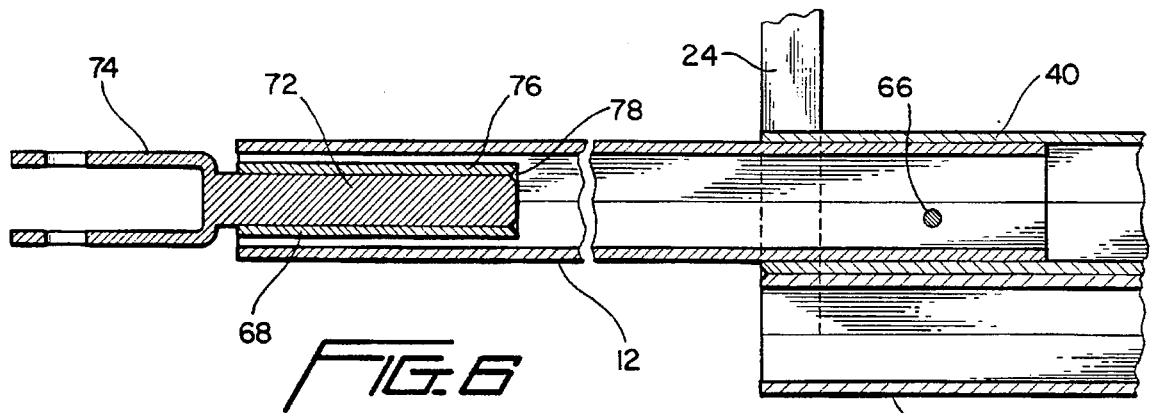
FIG. 6
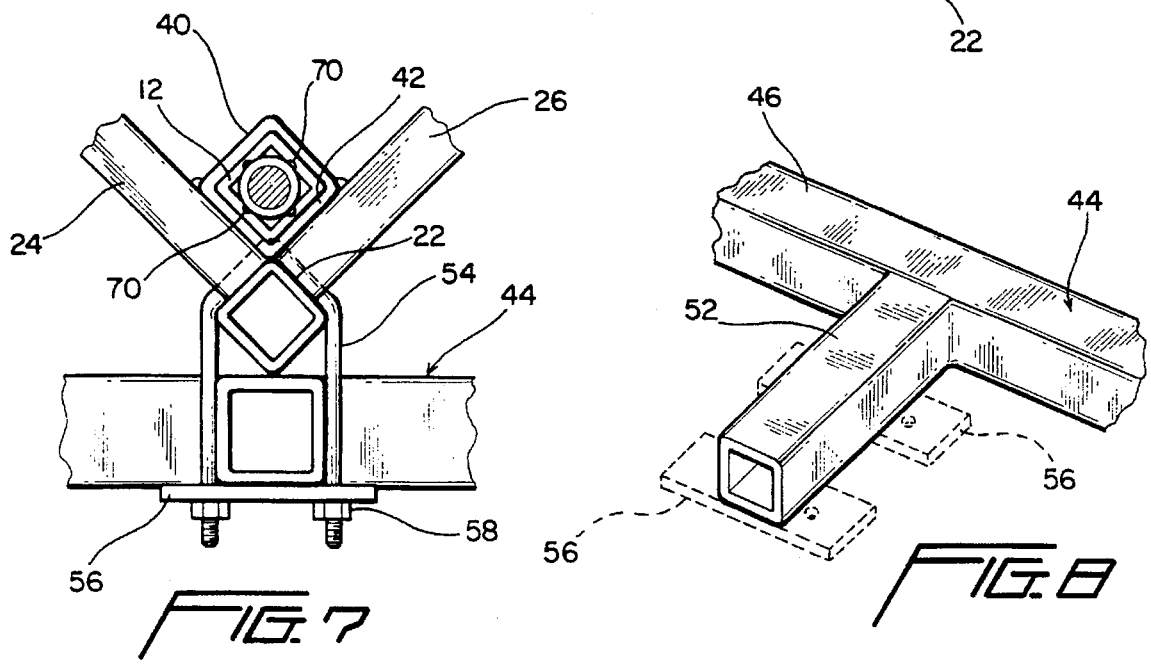
FIG. 7
FIG. 8

– 5,645,292 –

ATV TRAILER

BACKGROUND OF THE INVENTION

1. Field of the Invention

This invention relates to a light weight, balloon tire equipped trailer to be towed behind an all terrain vehicle and wherein the trailer includes an upwardly opening load bed of generally V-shape in transverse cross section. The trailer includes a forwardly projecting towing tongue from whose forward end is supported a towing coupler assembly mounted from the towing tongue for free angular displacement about a horizontal axis extending longitudinally of the towing tongue, the trailer being adapted to be tilted more than 90°, in either direction, onto one of its side wheels such that the normally upwardly opening load bed opens horizontally outwardly to one side of the trailer, all while the towing coupler on the forward end of the trailer tongue remains coupled to the rear of an associated ATV.

While the trailer is tilted upon its side, a large game kill such as a deer or elk may be readily maneuvered from a position lying upon the ground into the horizontally laterally outwardly opening load bed of the trailer, secured therein and the trailer may then be tilted back to an upright position resting on both of its wheels, all of which may be carried out by a single person who would otherwise be incapable of lifting a large game kill from the ground and into the load bed of the trailer if the latter remained in an upright position.

2. Description of Related Art

Various different forms of trailers heretofore have been constructed for the purpose of more efficient handling of loads thereon.

Examples of these previously known forms of trailers are disclosed in U.S. Pat. Nos. 2,856,091, 2,912,253, 3,413,014, 5,222,753, 5,295,555, 5,340,134 and 5,354,090.

However, these previously known forms of trailers do not include the overall combination of structural and operational features incorporated in the instant invention which specifically adapt the ATV trailer for use in loading large game kill onto the trailer in a deep wooded area and transporting the game kill out of the wooded area.

SUMMARY OF THE INVENTION

Hunters often hunt in large wooded areas and recently have extended their range in such wooded areas through the utilization of ATVs. Such all terrain vehicles are used to travel deeply into wooded areas, after which a hunter will dismount and walk to a distant stand area for hunting purposes.

Upon killing large game the hunter will then retrace his steps to the ATV, drive back to the kill area and attempt to lift the killed game onto a rack at the rear of the ATV.

This procedure may be carried out reasonably well as long as the killed game is not too large to be lifted up onto the rack of the ATV or too large for the ATV rack.

On the other hand, if larger game is expected to be encountered and killed, the ATV may trail a trailer therebehind and the trailer may be used to carry larger killed game out of the wooded area. However, there still remains the problem of lifting large game into the load bed of such a trailer.

Accordingly, a need exists to provide a means whereby a large game kill may be loaded onto an ATV trailer by a single person. To this end the ATV trailer of the instant invention is provided with a forwardly projecting towing tongue having a towing coupler assembly mounted thereon for rotation about an axis generally paralleling the towing tongue, includes large flotation tires and incorporates an upwardly opening load be which is generally V-shaped in transverse cross section.

By providing such a trailer to be towed to the kill area of large game, the trailer, while still coupled to the associated ATV, may be positioned alongside and spaced from the back area of large game kill lying on its side. The trailer then may be tilted slightly in excess of 90° onto its side with the weight of the trailer supported from that side wheel and the load bed of the trailer disposed immediately adjacent and opening toward the game kill.

Then, the game kill need only be slid across the ground, into the load bed and secured therein without actually lifting the game from the ground. Thereafter, the trailer may be tilted back up to an upright position resting on both of its wheels, all while the towing coupler remains coupled to the associated ATV for the purpose of maintaining positional stability of the trailer throughout the initial tilting of the trailer onto its side, the loading of the killed game into the load bed of the trailer and the reverse tilting of the trailer back to an upright position.

The main object of this invention is to provide a light weight ATV trailer specifically designed to greatly facilitate hunters in loading large killed game onto the trailer and transporting the killed game out of a deep woods areas.

Another object of this invention is to provide an ATV trailer of extremely simple construction and primarily of an assemblage of tubular members in order to maintain the weight of the trailer at a minimum not only to facilitate manual handling of the trailer but to also maintain the gross weight of the trailer and the load therein at a minimum.

Another important object of this invention is to provide an ATV trailer including a removably mounted tongue and towing coupler assembly so as to provide a trailer whose tongue and towing coupler assembly may be removed for compact storage or replaced so as to modify the trailer for use in conjunction with different ATVs.

Still another important object of this invention is to provide an ATV trailer including a novel light weight wheeled axle assembly and structure for mounting the axle assembly beneath the center longitudinal member of the trailer.

A final object of this invention to be specifically enumerated herein is to provide an ATV trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged left side elevational view of the trailer.

FIG. 4 is an enlarged top plan view of the trailer.

FIG. 5 is an enlarged rear elevational view of the trailer.

FIG. 6 is an enlarged fragmentary longitudinal vertical sectional view taken substantially upon the plane indicated by the section line 6—6 of FIG. 4.

FIG. 7 is an enlarged transverse vertical sectional view taken substantially upon the plane indicated by the section line 7—7 of FIG. 3.

FIG. 8 is a fragmentary perspective view of the longitudinal midportion of the axle assembly illustrating the laterally outwardly projecting mounting arm portion thereof.

DESCRIPTION OF THE PREFERRED EMBODIMENT

Figure 1:
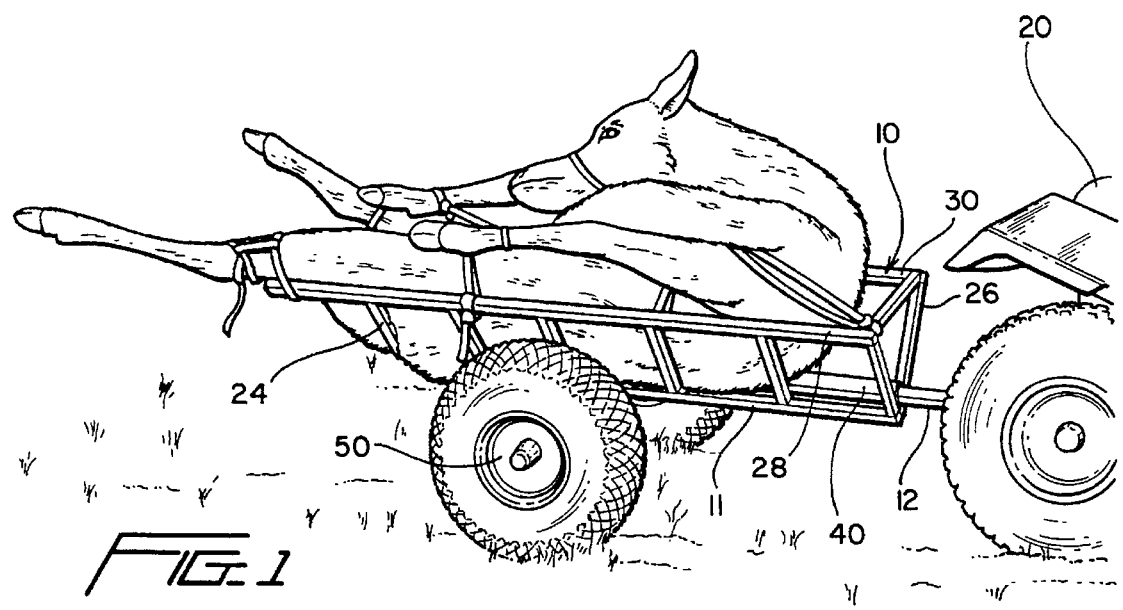
FIG. 1 is a perspective view of the ATV trailer as coupled to the rear of an ATV and with the trailer in an upright position and having a large game kill secured in the load bed of the trailer.

With reference now more specifically to the drawings the numeral 10 generally designates the ATV trailer of the instant invention. The trailer 10 includes a forwardly projecting towing tongue 12 having a forward end 14 from which a towing coupler 16 is supported. The towing coupler 16 is releasably coupled to a rearwardly projecting tow bar portion 18 projecting rearwardly from the rear of a conventional ATV (all terrain vehicle) 20.

The trailer 10 includes a body 11 incorporating a center, tubular longitudinal frame member 22 and a pair of opposite side, ladder-type sides 24 and 26 which project upwardly and outwardly from the frame member 22 at approximately a 45° angle in order to define an upwardly opening, V-shaped load bed.

The ladder-type sides 24 and 26 include upper end outer rails 28 and 30 which are joined at their rear ends though the utilization of a rear cross member 32 and at their forward ends through the utilization of a front cross member 34. In addition, the rear of the load bed or body 36 defined by the sides 24 and 26 extends rearwardly of the rear end of the frame member 22 and a rear inclined brace 38 extends and is secured between the rear end of the frame member 22 and the longitudinal central portion of the rear cross member 32.

All of elements 22–38 are constructed of square tubular stock and the forward end of the center longitudinal frame member 22 has a larger transverse dimension square tubular sleeve member 40 secured thereto and in the upwardly opening crotch 42 defined by the forward ends of the upwardly divergent sides 24 and 26, see FIG. 7.

An elongated transverse axle assembly referred to in general by the reference numeral 44 is defined by an elongated, square cross section tubular member 46 having stub axles 48 secured in its opposite end portions upon which flotation tire equipped wheels 50 are journaled. The longitudinal central portion of the tubular member 46 includes a forwardly projecting tubular mounting arm 52 which is clamped to the underside of the center longitudinal frame member 22 through the utilization of inverted, U-shaped bolts 54 and rectangular, apertured retaining plates 56 through which the U-shaped bolts 54 are secured by threaded nuts 58, see FIG. 7.

The sides 24 and 26 include substantially longitudinal midpoint anchor brackets 60 supported therefrom and projecting outwardly therefrom and the upper ends of a pair of upright tension rods or bolts 62 are suitably anchored to the anchor brackets 60 while the lower ends of the tension rods or bolts 62 are secured downwardly through anchor plates 64 carried by and projecting forwardly of the opposite end portions of the tubular member 46. In this manner, the axle assembly 44 is rigidly supported from the load bed or body 36.

The rear end of the towing tongue 12 is removably telescoped into the forward end of the sleeve member 40 and releasably secured therein through the utilization of a removable transverse pin 66 secured through the sleeve member 40 and the towing tongue 12.

The front end of the towing tongue 12 includes a cylindrical mounting sleeve 68 secured therein in any convenient manner such as by welding 70 and a solid cylindrical shank portion 72 of a clevis 74 is rotatably received through the mounting sleeve 68 and has a stop sleeve 76 secured to its rear end by welding 78 immediately rearward of the mounting sleeve 68. In this manner, the clevis 74 is supported from the mounting sleeve 68 for full 360° rotation relative thereto about an axis which substantially parallels the longitudinal member 22 of the trailer 10. Of course, the clevis 74 may be pivotally secured to the tow bar portion 18 through the utilization of a removable hitch pin 80, see FIG. 3. Further, the clevis and hitch pin connection between the towing tongue 12 and the tow bar portion 18 has sufficient clearance therein in order to enable limited relative angular displacement between the ATV 20 and the trailer 10 about a horizontal transverse axis. Still further, although the clevis 74 is illustrated as being generally U-shaped, a more conventional clevis of generally C-shaped configuration may be used and secured in any convenient manner such as by welding to the shank portion 72. In addition, other mating couplers and tow bar portions may be used, if desired.

Figure 2:
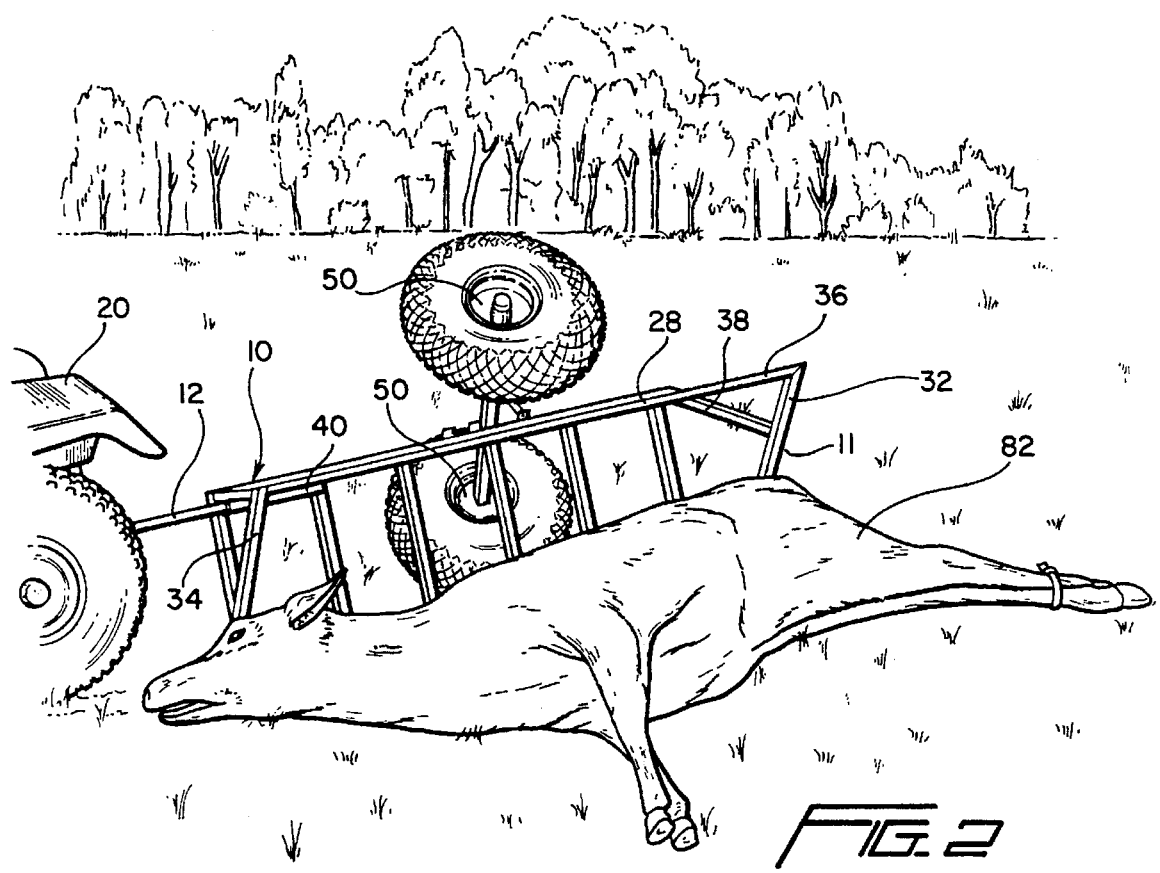
FIG. 2 is a further perspective view of the trailer in a laterally tilted position lying upon one side thereof and paralleling and closely adjacent the back of a large game kill lying upon the ground.

With attention now invited more specifically to FIG. 2 of the drawings, there may be seen an animal 82 such as a deer or elk lying upon the ground. In order to load the animal 82 into the load bed or body 36 of the trailer, the trailer 10 is initially positioned alongside the back of the animal 82 a spaced distance therefrom. Then, without uncoupling the towing tongue 12 from the tow bar portion 18, the trailer 10 is rolled over on its left side such that the now horizontally opening load bed 36 is immediately adjacent the back of the animal 82. Then, the shoulder and hind quarters of the animal 82 may be shifted along the ground into the load bed 36 and secured therein. Thereafter, the trailer 10 is righted to the position thereof illustrated in FIG. 1 and the head and neck of the animal 82 is folded back and secured in position. Thereafter, the ATV 20 may be used to tow the trailer and the kill or animal 82 to a distant location.

Since the conception of the trailer 10 and subsequent to its usage in actual hunting practices, it has been found that if the animal 82 is secured within the load body 36 and the ATV 20 is angled to the right from the position thereof illustrated in FIG. 2 of the drawings such that the ATV 20 is headed toward the background of FIG. 2, if the load represented by the animal 82 is not in excess of 350 lbs., the trailer 10 may be righted merely by driving the ATV 20 to the left and angled toward the background of FIG. 2. As the ATV 20 moves forward and the front end of the trailer 10 scrapes the ground in a direction inclined to the left and to the background of FIG. 2, the trailer 10 will automatically right itself with the animal 82 therein. Thus, and particularly if the animal 82 is considerably less than 350 lbs. in weight, the animal 82 may be readily loaded into the load bed 36 and the trailer 10 may be readily righted through the utilization of the ATV 20.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A trailer including a center longitudinal frame member and longitudinal sides mounted from said frame member and diverging Upwardly therefrom, an elongated transverse wheeled axle assembly including a central portion anchored relative to said longitudinal frame member and opposite end portions from which ground wheels are journaled, and a generally upright brace including upper and lower ends extending between each of said axle assembly end portions and an upper portion of the corresponding trailer side with said upper and lower ends anchored relative to said trailer side and axle end portion, said axle assembly including a longitudinal central mounting arm projecting horizontally laterally outwardly therefrom underlying, generally paralleling and secured to said longitudinal frame member.

2. The trailer of claim 1 wherein said sides are at least generally planar and are disposed at generally 90° relative to each other.

3. A trailer including an elongated, longitudinally extending body having front and rear ends, at least one pair of rear opposite side ground wheels journaled from said body, an elongated, towing tongue supported and projecting forwardly from said front end, a towing coupler mounted from a forward portion of said towing tongue for angular displacement relative to said towing tongue about an axis generally paralleling said towing tongue, said towing coupler defining at least one upright position thereof for releasably coupling to an associated tow hitch, said towing coupler being angularly displacable at least 90°, in either direction, relative to said towing tongue about said axis from said upright position, said body including a longitudinal frame member and said ground wheels being journaled from opposite end portions of an elongated, transverse axle assembly, said trailer including longitudinal sides diverging upwardly from said longitudinal frame member, said axle assembly including a central portion anchored relative to said longitudinal frame member, and a generally upright brace including upper and lower ends extending between each of said axle assembly end portions and an upper portion of the corresponding trailer side with said upper and lower ends anchored relative to said trailer side and axle end portion.

4. The trailer of claim 3 wherein said towing coupler is mounted from said towing tongue for full 360° rotation about said axis.

5. The trailer of claim 3 wherein said sides are at least generally planar and are disposed at generally 90° relative to each other.

6. The trailer of claim 5 wherein said axle assembly includes a longitudinal central mounting arm projecting horizontally laterally outwardly therefrom, underlying, generally paralleling and secured to said longitudinal frame member.

* * * * *